(12) United States Patent
Kamata et al.

(10) Patent No.: US 9,737,869 B2
(45) Date of Patent: Aug. 22, 2017

(54) REACTOR

(71) Applicant: IHI Corporation, Tokyo (JP)

(72) Inventors: Hiroyuki Kamata, Tokyo (JP); Koki Hamada, Tokyo (JP); Takuya Yoshinoya, Tokyo (JP)

(73) Assignee: IHI CORPORATION, Tokyo (JP)

( * ) Notice: Subject to any disclaimer, the term of this patent is extended or adjusted under 35 U.S.C. 154(b) by 2 days.

(21) Appl. No.: 14/818,362

(22) Filed: Aug. 5, 2015

(65) Prior Publication Data
US 2015/0336077 A1 Nov. 26, 2015

Related U.S. Application Data

(63) Continuation-in-part of application No. PCT/JP2014/052662, filed on Feb. 5, 2014.

(30) Foreign Application Priority Data

Feb. 6, 2013 (JP) .................................. 2013-020987

(51) Int. Cl.
*B01J 19/00* (2006.01)
*B01J 19/24* (2006.01)
(Continued)

(52) U.S. Cl.
CPC ......... *B01J 19/249* (2013.01); *B01J 19/0093* (2013.01); *C01B 3/384* (2013.01);
(Continued)

(58) Field of Classification Search
CPC . B01J 19/00; B01J 19/24; B01J 19/248; B01J 19/249; B01J 2219/00049; B01J 2219/00051; B01J 2219/00074; B01J 2219/00076; B01J 2219/00085; B01J 2219/00781; B01J 2219/00819;
(Continued)

(56) References Cited

U.S. PATENT DOCUMENTS

| 2003/0105172 A1 | 6/2003 | Bowe et al. |
| 2003/0219903 A1 | 11/2003 | Wang et al. |

(Continued)

FOREIGN PATENT DOCUMENTS

| JP | 2000-154001 A | 6/2000 |
| JP | 2002-143675 A | 5/2002 |

(Continued)

OTHER PUBLICATIONS

Machine translation of JP 2002-356303 A, which is provided in IDS filed Aug. 5, 2015 and published Dec. 13, 2002.*

(Continued)

*Primary Examiner* — Natasha Young (57) ABSTRACT

A reactor includes a reaction-side flow passage through which a reaction fluid being a fluid constituting a reaction object flows; a temperature controller (heat-medium side flow passage) configured to heat or cool the reaction fluid from outside the reaction-side flow passage; and a catalyst configured to promote a reaction of the reaction fluid, the catalyst provided in the reaction-side flow passage so that a contact area with the reaction fluid is larger on a downstream side than on an upstream side in the reaction-side flow passage.

4 Claims, 4 Drawing Sheets

(51) Int. Cl.
*C01B 3/00* (2006.01)
*C01B 3/02* (2006.01)
*C01B 3/32* (2006.01)
*C01B 3/34* (2006.01)
*C01B 3/38* (2006.01)

(52) U.S. Cl.
CPC ............... *B01J 2219/00085* (2013.01); *B01J 2219/0086* (2013.01); *B01J 2219/00783* (2013.01); *B01J 2219/00822* (2013.01); *B01J 2219/00835* (2013.01); *B01J 2219/00855* (2013.01); *B01J 2219/00873* (2013.01); *B01J 2219/00898* (2013.01); *B01J 2219/2453* (2013.01); *B01J 2219/2462* (2013.01); *B01J 2219/2479* (2013.01); *C01B 2203/0233* (2013.01); *C01B 2203/0833* (2013.01); *C01B 2203/1047* (2013.01); *C01B 2203/1058* (2013.01); *C01B 2203/1064* (2013.01); *Y02P 20/52* (2015.11)

(58) Field of Classification Search
CPC .... B01J 2219/00835; B01J 2219/00858; B01J 2219/0086; B01J 2219/00873; B01J 2219/24; B01J 2219/2401; B01J 2219/242; B01J 2219/2451; B01J 2219/2453; B01J 2219/2461; B01J 2219/2462; B01J 2219/2476; B01J 2219/2479; C01B 3/00; C01B 3/02; C01B 3/32; C01B 3/34; C01B 3/38; C01B 3/384; C01B 2203/00; C01B 2203/02; C01B 2203/0205; C01B 2203/0227; C01B 2203/0233; C01B 2203/08; C01B 2203/0805; C01B 2203/0833; C01B 2203/10; C01B 2203/1041; C01B 2203/1047; C01B 2203/1052; C01B 2203/1058; C01B 2203/1064
See application file for complete search history.

(56) References Cited

U.S. PATENT DOCUMENTS

| | | | |
|---|---|---|---|
| 2005/0163701 | A1 | 7/2005 | Tonkovich et al. |
| 2005/0188617 | A1 | 9/2005 | Ogura et al. |
| 2007/0258883 | A1* | 11/2007 | West ............. B01J 19/249 423/652 |
| 2010/0280136 | A1* | 11/2010 | Tonkovich ........ B01J 19/0093 518/706 |

FOREIGN PATENT DOCUMENTS

| | | |
|---|---|---|
| JP | 2002-356303 A | 12/2002 |
| JP | 2003-519563 A | 6/2003 |
| JP | 2005-103399 A | 4/2005 |
| JP | 2005-238099 A | 9/2005 |
| JP | 2011-072937 A | 4/2011 |
| WO | 01/51194 A1 | 7/2001 |

OTHER PUBLICATIONS

Machine translation of JP 2002-143675 A, which is provided in IDS filed Aug. 5, 2015 and published May 21, 2002.*
International Search Report received for International Patent Application No. PCT/JP2014/052662 mailed on May 13, 2014, 5 pages (2 pages of English Translation of International Search Report and 3 pages of International Search Report).
European Patent Office, "Extended European Search Report," issued on Sep. 28, 2016, in European Patent Application No. 14 748 787.0, which is a European counterpart of U.S. Appl. No. 14/818,362, 7 pages.

* cited by examiner

REACTOR

CROSS REFERENCE TO RELATED APPLICATIONS

This application is a continuation-in-part application of International Application No. PCT/JP2014/052662, now WO 2014/123152, filed on Feb. 5, 2014, which claims priority to Japanese Patent Application No. 2013-020987, filed on Feb. 6, 2013, the entire contents of which are incorporated by reference herein.

BACKGROUND

1. Field

The present disclosure relates to a reactor for conducting a reaction.

2. Description of the Related Art

A reactor having at least one side of a flow passage section at approximately several mm and a microreactor having at least one side of a flow passage section at less than 1 mm are generally known. A reactor having such a micro space as a reaction field (compact reactor) has a large specific surface area per unit volume. Thus, heat transfer efficiency is high, and a reaction speed or yield can be improved. Moreover, by arbitrarily constituting convection or diffusion modes, rapid mixing or control of positively applying concentration distribution can be realized. Therefore, reactions can be strictly controlled.

A heat-exchange type reactor provided with a reaction-side flow passage to be a reaction field and a heat-medium side flow passage which is provided in parallel with the reaction-side flow passage with a heat-transfer partition between them and through which a heat medium performing heat exchange with a reaction fluid flowing through the reaction-side flow passage flows has been also developed. This heat-exchange type reactor attracts attention since it can conduct reactions efficiently in the reaction-side flow passage.

In this type of reactor, a catalyst is arranged in the reaction-side flow passage (reaction field), and a reaction fluid constituting a reaction object is made to flow through the reaction-side flow passage so as to promote a reaction. As a technology of arranging the catalyst in the reaction-side flow passage, a technology in which a catalyst is carried by a metal plate having a corrugated shape, and the metal plate carrying the catalyst is installed on the reaction-side flow passage so that the catalyst is uniformly arranged over the entire region of the reaction-side flow passage is disclosed (see Japanese Patent Laid-Open Publication No. 2000-154001 (Patent Literature 1)).

SUMMARY

When a reaction is to be conducted in a reactor, on an upstream side (inlet side) of a reaction-side flow passage, since an unreacted substance is contained in a reaction fluid in a relatively large quantity, a reaction rate becomes high, and the reaction progresses as the reaction fluid flows through the reaction-side flow passage. On a downstream side (outlet side) of the reaction-side flow passage, since the unreacted substance has been transformed into a targeted reaction product and its quantity has become relatively small, the reaction rate lowers. Therefore, when an endothermic reaction is to be conducted in the prior-art reactor in the above-described Patent Literature 1 in which the catalyst is uniformly arranged over the entire region of the reaction-side flow passage, the reaction rate becomes so high that supply of heat by the heat medium cannot catch up with on the upstream side of the reaction-side flow passage (heating becomes rate-limiting), and the catalyst does not sufficiently function. On the downstream side of the reaction-side flow passage, since the reaction rate becomes low, though heat supply is sufficient, the catalyst runs short (an amount of the catalyst becomes rate-limiting).

Similarly, when an exothermic reaction is to be conducted in the prior-art reactor, on the upstream side of the reaction-side flow passage, the reaction rate becomes so high that cooling of the reaction fluid by the heat medium cannot catch up with (heat removal becomes rate-limiting), and the catalyst does not sufficiently function, or a temperature rises too much, which might lead to deactivation or dissolution of the catalyst. On the downstream side of the reaction-side flow passage, since the reaction rate lowers, though cooling is sufficient, the catalyst might run short.

Particularly, in the above-described compact reactor, since a load of the reaction fluid to the catalyst per unit volume becomes relatively larger than a large-sized reactor, heat-transfer rate-limiting or heat-removal rate-limiting becomes remarkable.

The present disclosure has an object to provide a reactor that can reduce insufficient heat transfer and improve reaction efficiency by devising an arrangement mode of a catalyst in the reaction-side flow passage.

An aspect of the present disclosure is a reactor including a reaction-side flow passage through which a reaction fluid as a reaction object flows; a temperature controller configured to heat or cool the reaction fluid from outside the reaction-side flow passage; and a catalyst configured to promote a reaction of the reaction fluid, the catalyst provided in the reaction-side flow passage so that a contact area with the reaction fluid is larger on a downstream side than on an upstream side in the reaction-side flow passage.

The temperature controller may include a heat-medium side flow passage through which a heat medium flows as a fluid performing heat exchange with a reaction fluid flowing through the reaction-side flow passage, the heat-medium side flow passage being provided in parallel with the reaction-side flow passage through a heat-transfer partition.

A gas may flow as the heat medium in the heat-medium side flow passage.

The reaction-side flow passage and the heat-medium side flow passage may be alternately stacked.

The catalyst may have a plate shape and the catalyst may be divided into a plurality of parts and arranged in a flowing direction of the reaction fluid in the reaction-side flow passage.

The catalyst may be arranged away from each other.

According to the present disclosure, by devising the arrangement mode of the catalyst in the reaction-side flow passage, insufficient heat transfer can be reduced, and reaction efficiency can be improved.

DESCRIPTION OF THE EMBODIMENTS

An embodiment of the present disclosure will be described below in detail by referring to the attached drawings. Dimensions, materials, and other specific numerical values and the like illustrated in the embodiment are only exemplification for facilitating understanding of the disclosure, and except as described otherwise, they do not limit the present disclosure. In this Description and the attached drawings, the same reference numerals are given to the elements having substantially the same functions or constitutions so as to omit duplicated explanation, and elements not directly relating to the present disclosure are not illustrated.

(Reactor 100)

Figure 1A:
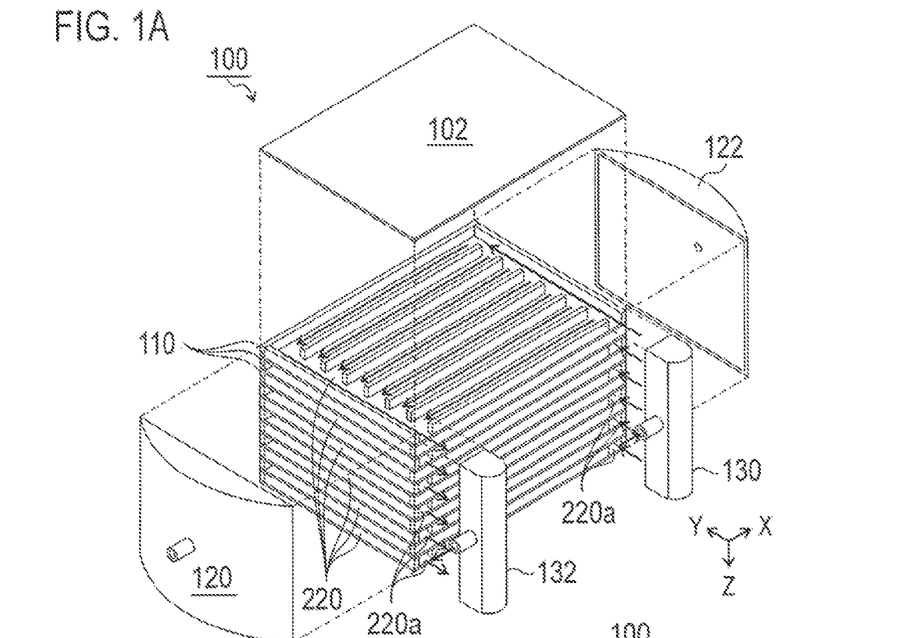
FIGS. 1A and 1B are views for explaining a reactor.
Figure 1B:
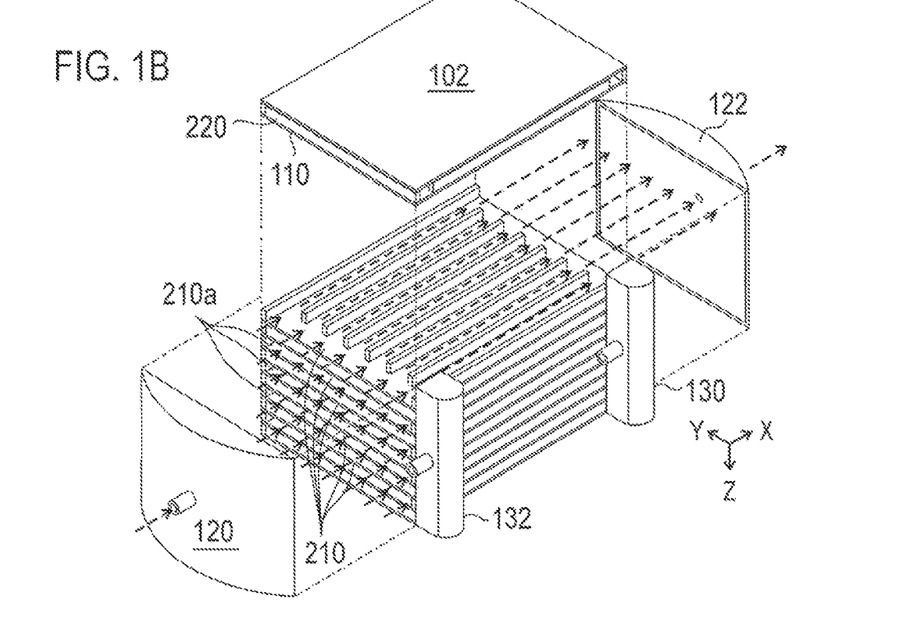
Figure 2A:
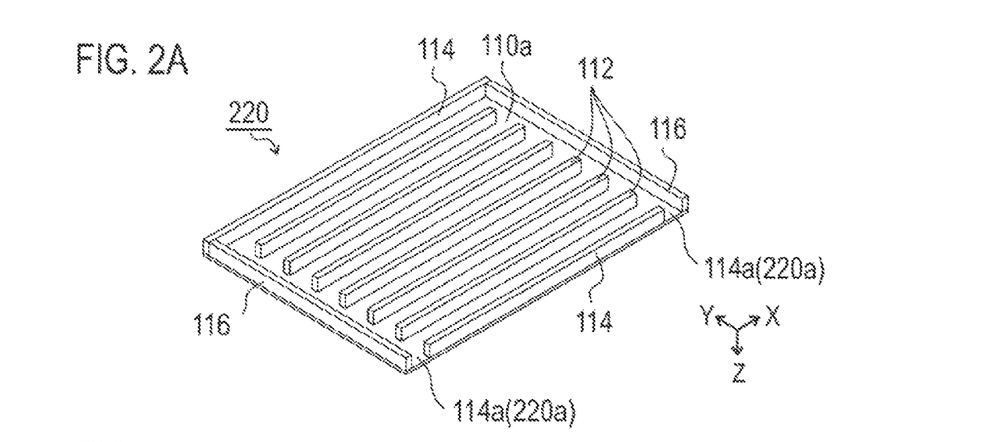
FIGS. 2A to 2C are views for explaining a reaction-side flow passage and a heat-medium side flow passage.
Figure 2B:
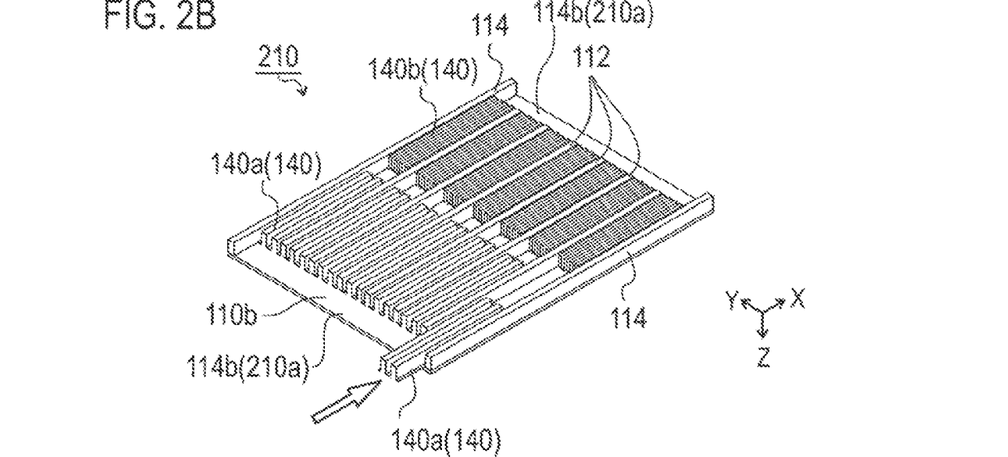
Figure 2C:
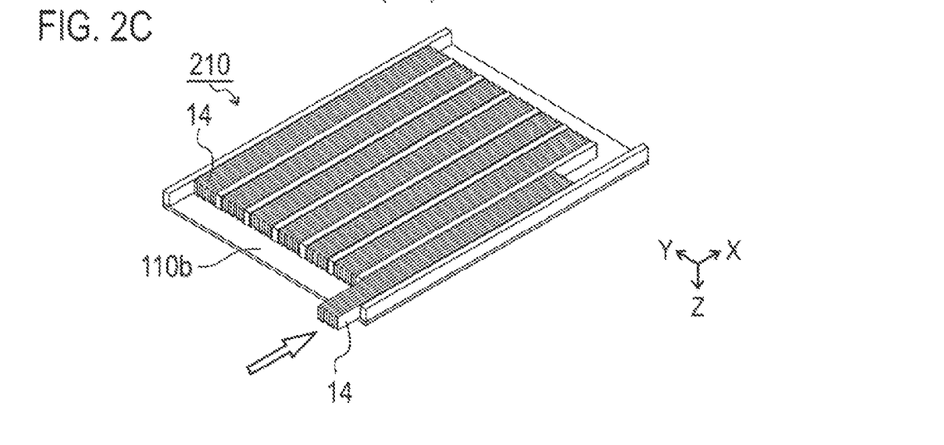

FIGS. 1A and 1B are views for explaining a reactor 100 according to this embodiment. FIGS. 2A to 2C are views for explaining a reaction-side flow passage 210 and a heat-medium side flow passage 220. In FIGS. 1A and 1B and FIGS. 2A to 2C illustrating this embodiment, the X-axis, the Y-axis, and the Z-axis crossing each other perpendicularly are defined as illustrated. In FIGS. 1A and 1B, description of a catalyst 140 is omitted for facilitating understanding.

As illustrated in FIGS. 1A and 1B, the reactor 100 has a structure in which heat-transfer partitions 110 are stacked in plural at an interval determined in advance. An upper surface 102, the heat-transfer partition 110 (which might be illustrated as 110a and 110b in some cases), a reaction fluid inlet portion 120, a reaction fluid outlet portion 122, a heat-medium inlet portion 130, and a heat medium outlet portion 132 constituting the reactor 100 are all formed of a metal material (stainless steel (heat-resistant metal such as SUS310, Haynes (registered trademark) 230) and the like, for example).

When the reactor 100 is to be manufactured, the heat-transfer partitions 110 are stacked and joined to each other, and the upper surface 102 is joined to the heat-transfer partition 110. Then, the reaction fluid inlet portion 120, the reaction fluid outlet portion 122, the heat-medium inlet portion 130, and the heat medium outlet portion 132 are joined to the stacked heat-transfer partitions 110, respectively. A joining method used when the reactor 100 is manufactured is not limited but TIG (Tungsten Inert Gas) welding or diffusion bonding can be used, for example.

Here, in a space defined by the heat-transfer partition 110, a space communicating with the reaction fluid inlet portion 120 and the reaction fluid outlet portion 122 through a hole 210a formed on sides of the reaction fluid inlet portion 120 and the reaction fluid outlet portion 122 serves as a reaction-side flow passage 210. Moreover, in a space defined by the heat-transfer partition 110, a space communicating with the heat-medium inlet portion 130 and the heat medium outlet portion 132 through a hole 220a formed on sides of the heat-medium inlet portion 130 and the heat medium outlet portion 132 serves as a heat-medium side flow passage 220. In the reactor 100 in this embodiment, the reaction-side flow passage 210 and the heat-medium side flow passage 220 are defined by the heat-transfer partition 110 and provided in parallel, and the reaction-side flow passage 210 and the heat-medium side flow passage 220 are stacked alternately.

Specifically explaining, as illustrated in FIG. 2A, the heat-medium side flow passage 220 has a bottom surface constituted by the heat-transfer partition 110 (indicated by 110a in FIG. 2A). An upper surface of the heat-medium side flow passage 220 is constituted by an upper surface 102 or a heat-transfer partition 110 which will be described later (indicated by 110b in FIG. 2B). On the heat-transfer partition 110a, a plurality of ribs 112 is provided for holding an interval between the heat-transfer partitions 110. Moreover, a side wall portion 114 constituting a side wall of the reactor 100 and a sidebar 116 for preventing mixing of the reaction fluid from the reaction fluid inlet portion 120 are provided on the heat-transfer partition 110a. Moreover, in the side wall portion 114, a notch 114a is provided on the side wall portion 114 on a side on which the heat-medium inlet portion 130 and the heat medium outlet portion 132 are joined. When the heat-transfer partitions 110 are stacked, the notch 114a forms the hole 220a. The heat medium is introduced into the heat-medium side flow passage 220 through the hole 220a from the heat-medium inlet portion 130 or is discharged from inside the heat-medium side flow passage 220 through the hole 220a to the heat-medium outlet portion 132.

As illustrated in FIG. 2B, the reaction-side flow passage 210 has its bottom surface constituted by the heat-transfer partition 110b. The upper surface of the reaction-side flow passage 210 is constituted by the heat-transfer partition 110a. On the heat-transfer partition 110b, too, a plurality of the ribs 112 for holding an interval between the heat-transfer partitions 110 and a plurality of the side wall portions 114 are provided similarly to the heat-transfer partition 110a. On the heat-transfer partition 110b, the side bar 116 is not provided unlike the heat-transfer partition 110a. Thus, a gap 114b is formed between the both side wall portions 114. The gap 114b forms the hole 210a when the heat-transfer partitions 110 are stacked. The reaction fluid is introduced into the reaction-side flow passage 210 through the hole 210a from the reaction fluid inlet portion 120, or a reaction product is discharged from inside the reaction-side flow passage 210 through the hole 210a to the reaction fluid outlet portion 122. Moreover, the catalyst 140 (indicated as 140a and 140b in FIG. 2B) with an active metal carried by a metal plate having a corrugated shape is installed in the reaction-side flow passage 210.

Here, the active metal is an active metal suitable for a reaction to be conducted in the reaction-side flow passage 210. For example, if a reaction to be conducted in the reaction-side flow passage 210 is a steam reforming reaction of methane, it is one or a plurality of metals selected from a group consisting of Ni (nickel), Ru (ruthenium), Pt (platinum), and Rh (rhodium). Moreover, in this embodiment, the active metal is assumed to be substantially uniformly carried by the metal plate.

Explanation will be made by returning to FIGS. 1A and 1B. When a heat medium is introduced from the heat-medium inlet portion 130, as indicated by a solid line arrow in FIG. 1A, the heat medium flows through the heat-medium side flow passage 220 and is discharged from the heat-medium outlet portion 132. When a reaction fluid (a fluid constituting a reaction object) is introduced from the reaction fluid inlet portion 120, as indicated by a broken line arrow in FIG. 1B, the reaction fluid flows through the reaction-side flow passage 210 and is discharged from the reaction fluid outlet portion 122. As illustrated in FIGS. 1A and 1B, the reaction fluid and the heat medium are in a relation of a counter flow in this embodiment.

As described above, since the reaction-side flow passage 210 and the heat-medium side flow passage 220 are provided in parallel by being defined by the heat-transfer partition 110, the heat medium flowing through the heat-medium side flow passage 220 performs heat exchange with the reaction fluid flowing through the reaction-side flow passage 210 through the heat-transfer partition 110. Here, if an endothermic reaction is conducted in the reaction-side flow passage 210, the heat-medium side flow passage 220 and the heat medium supply heat to (heat) the reaction fluid flowing through the reaction-side flow passage 210, while if an exothermic reaction is conducted in the reaction-side flow passage 210, the heat-medium side flow passage 220 and the heat medium function as a temperature controller for removing heat from (cooling) the reaction fluid flowing through the reaction-side flow passage 210.

In this embodiment, a gas flows as the heat medium in the heat-medium side flow passage 220. With such a constitution, handling is easier than in a case where the heat medium is constituted by a liquid.

When a reaction is to be conducted in the reaction-side flow passage 210 in such a reactor 100, since an unreacted substance is contained in a relatively large quantity in the reaction fluid on an upstream side of the reaction-side flow passage 210, a reaction rate becomes high. On the other hand, since the reaction progresses as the reaction fluid flows through the reaction-side flow passage 210, the unreacted substance has been transformed into a targeted reaction product and its quantity has become relatively small on a downstream side of the reaction-side flow passage 210. Thus, the reaction rate becomes low on the downstream side of the reaction-side flow passage 210.

Therefore, as in a comparative example illustrated in FIG. 2C, if a catalyst 14 is uniformly arranged over the entire region of the reaction-side flow passage 210, in the case of the endothermic reaction, the reaction rate becomes so high on the upstream side of the reaction-side flow passage 210 that the heat supply by the heat medium cannot catch up with (heating becomes rate-limiting), and the catalyst 14 does not function sufficiently. On the downstream side of the reaction-side flow passage 210, since the reaction rate lowers, though the heat supply is sufficient, the catalyst 14 is not sufficient (an amount of the catalyst 14 becomes rate-limiting).

For example, since the steam reforming reaction of methane illustrated in chemical formula (1) below and a dry reforming reaction of methane illustrated in chemical formula (2) below are endothermic reactions, heating becomes rate-limiting on the upstream side of the reaction-side flow passage 210, while the amount of the catalyst 14 becomes rate-limiting on the downstream side of the reaction-side flow passage 210.

$$CH_4 + H_2O \rightarrow 3H_2 + C) \qquad \text{Chemical formula (1)}$$

The steam reforming reaction of methane illustrated in the above-described chemical formula (1) is an endothermic reaction with an enthalpy change ($\Delta^0_{298}H$) at approximately −206 kJ/mol.

$$CH_4 + CO_2 \rightarrow 2H_2 + 2CO \qquad \text{Chemical formula (2)}$$

The dry reforming reaction of methane illustrated in the above-described chemical formula (2) is an endothermic reaction with an enthalpy change ($\Delta^0_{298}H$) at approximately −247 kJ/mol.

Moreover, an FT (Fischer Tropsch) synthesis reaction illustrated in chemical formula (3) below is an exothermic reaction, and thus, on the upstream side of the reaction-side flow passage 210, heat removal becomes rate-limiting, while on the downstream side of the reaction-side flow passage 210, the amount of the catalyst 14 becomes rate-limiting, for example.

$$(2n+1)H_2 + nCO \rightarrow C_nH_{2n+2} + nH_2O \qquad \text{Chemical formula (3)}$$

As described above, heat-transfer rate-limiting such as heating rate-limiting or heat-removal rate-limiting means that the catalyst 14 is unnecessarily arranged.

In the reactor 100 with at least a side of a flow-passage section at approximately several mm in which a distance in the X-axis direction in FIGS. 1A and 1B is approximately 1 m, a distance in the Y-axis direction in FIGS. 1A and 1B is approximately 1 m, and a separation distance between the heat-transfer partitions 110 is approximately several mm (4 mm, for example) or in the reactor 100 (compact reactor) having a micro space as a reaction field such as a microreactor with at least a side of a flow-passage section at less than 1 mm, a load of the reaction fluid to the catalyst 14 per unit volume becomes relatively larger than that of a large-sized reactor and thus, the heat-transfer rate-limiting becomes remarkable. In FIGS. 1A and 1B, for facilitation of understanding, the separation distance between the heat-transfer partitions 110 is illustrated larger than the distance in the X-axis direction and the distance in the Y-axis direction in FIGS. 1A and 1B.

Figure 3:
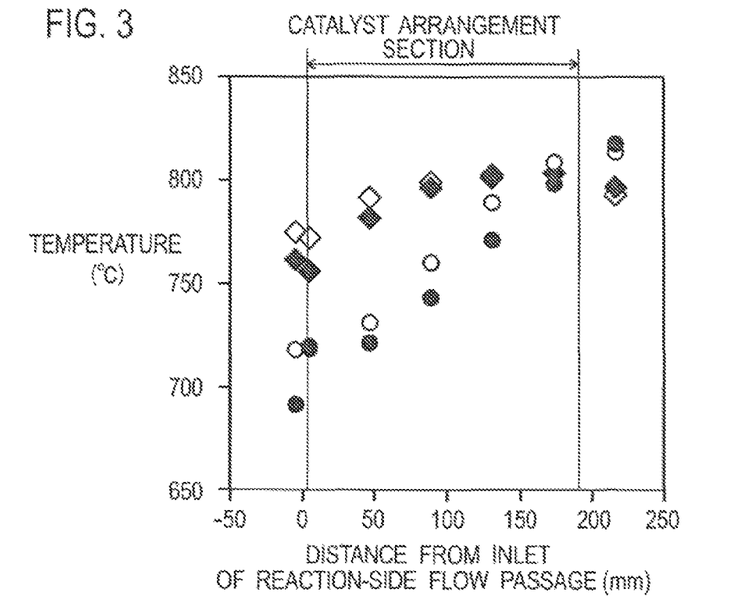
FIG. 3 is a view for explaining a temperature of a reaction fluid when a steam reforming reaction of methane is conducted in the reactor.

FIG. 3 is a view for explaining a temperature of the reaction fluid when the steam reforming reaction of methane is conducted in the reactor 100. In FIG. 3, assuming that a white square SV (Space Velocity) is one, a black square SV is two, a white circle SV is six, and a black circle SV is ten. Here, SV is a value indicating a load of the reaction fluid to the catalyst 140, which is generally referred to a volumetric flow rate of reactants divided by the bed volume of a catalyst. As illustrated in FIG. 3, as the SV becomes larger (the load of the reaction fluid to the catalyst 140 becomes larger), that is, as a flow-passage sectional area becomes smaller, a temperature drop on the upstream side of the reaction-side flow passage 210 becomes remarkable. That is, as the flow-passage sectional area becomes smaller, the upstream side of the reaction-side flow passage 210 can become heat-transfer rate-limiting more easily.

Moreover, if the catalyst 14 is uniformly arranged over the entire region of the reaction-side flow passage 210 and the endothermic reaction or the exothermic reaction is conducted as illustrated in the above-described comparative example, a temperature difference (temperature gradient) is generated in a flow-passage direction in the reaction-side flow passage 210 itself or the heat-medium side flow passage 220 itself. Then, a heat stress is applied to the heat-transfer partition 110 defining the reaction-side flow passage 210 and the heat-medium side flow passage 220. As described above, since an outer periphery of the heat-transfer partition 110 is joined to the side surfaces 104, 106a, and 106b, if the heat stress is applied to the heat-transfer partition 110, there is a concern that distortion (rattling) occurs in the heat-transfer partition 110.

Thus, in this embodiment, by devising the arrangement mode of the catalyst 140 in the reaction-side flow passage 210, insufficient heat transfer is reduced, and reaction efficiency is improved.

In this embodiment, the catalyst 140 is provided in the reaction-side flow passage 210 so that a contact area with the reaction fluid is larger on the downstream side than on the upstream side in the reaction-side flow passage 210. Specifically explaining by returning to FIGS. 2A to 2C, the catalyst 140 is divided into a plurality of parts (two parts in this embodiment) and arranged in a flowing direction of the reaction fluid in the reaction-side flow passage 210. The catalyst 140*a* is arranged on the upstream side in the reaction-side flow passage 210, while the catalyst 140*b* is arranged on the downstream side.

Figure 4A:
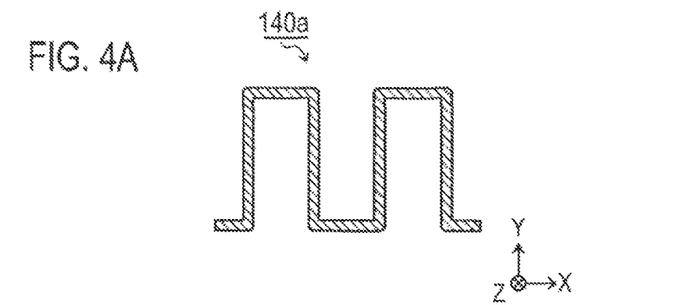
FIGS. 4A and 4B are views for explaining a flow passage section of a catalyst.
Figure 4B:
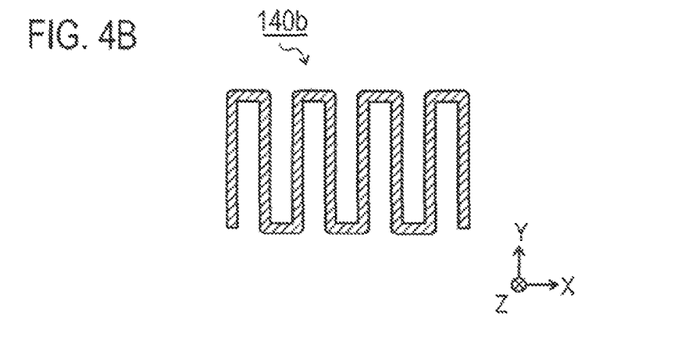

FIGS. 4A and 4B are views for explaining the flow-passage section of the catalyst 140, in which FIG. 4A illustrates the flow-passage section of the catalyst 140*a* arranged on the upstream side of the reaction-side flow passage 210, and FIG. 4B illustrates the flow-passage section of the catalyst 140*b* arranged on the downstream side of the reaction-side flow passage 210. As illustrated in FIGS. 4A and 4B, when the flow-passage section of the catalyst 140*a* and the flow-passage section of the catalyst 140*b* are compared, the catalyst 140*b* has more folding-backs. That is, the catalyst 140 is arranged so that the contact area between the reaction fluid and the catalyst 140 is larger on the downstream side than on the upstream side.

Figure 5:
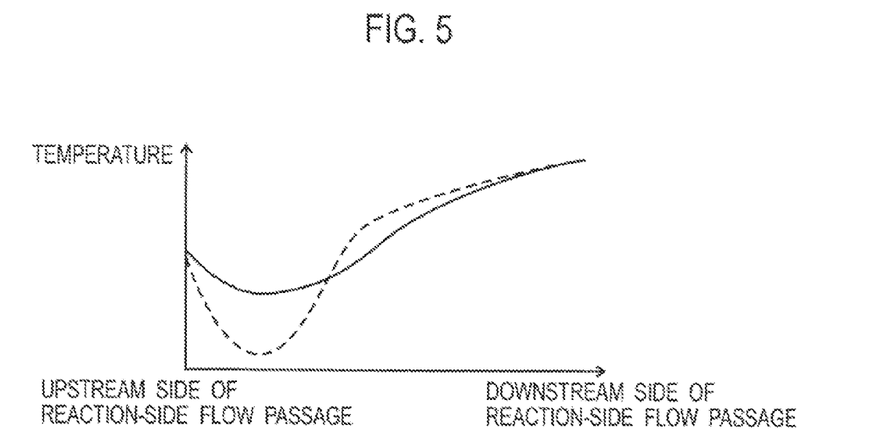
FIG. 5 is a view for explaining a temperature change of the reaction fluid in an arrangement of the catalyst of the present embodiment illustrated in FIG. 2B and an arrangement of the catalyst of a comparative example illustrated in FIG. 2C.

FIG. 5 is a view for explaining a temperature change of the reaction fluid between the arrangement of the catalysts 140*a* and 140*b* in this embodiment illustrated in FIG. 2B and the arrangement of the catalyst 14 of the comparative example illustrated in FIG. 2C. As indicated by a broken line in FIG. 5, in the comparative example in which the catalyst 14 is uniformly arranged over the entire region of the reaction-side flow passage 210 illustrated in FIG. 2C, the reaction rate becomes so high on the upstream side of the reaction-side flow passage 210 that the heat supply by the heat medium cannot catch up with (heating becomes rate-limiting), and the temperature rapidly drops.

On the other hand, as indicated by a solid line in FIG. 5, in the reactor 100 of this embodiment in which the catalyst 140*a* with a relatively smaller number of folding-backs is arranged on the upstream side of the reaction-side flow passage 210 illustrated in FIG. 2B, while the catalyst 140*b* with a relatively larger number of folding-backs is arranged on the downstream side, the temperature drop is suppressed on the upstream side of the reaction-side flow passage 210.

With the constitution as above in which the catalyst 140 is provided so that the contact area with the reaction fluid is larger on the downstream side than on the upstream side in the reaction-side flow passage 210, by making the contact area between the catalyst 140 and the reaction fluid relatively smaller on the upstream side where the reaction rate tends to be high, an increase in the reaction rate is suppressed, and the insufficient heat transfer is reduced, whereby heat-transfer rate-limiting can be prevented. Moreover, by making the contact area between the catalyst 140 and the reaction fluid relatively larger on the downstream side where the reaction rate tends to be low, the reaction rate can be increased. As a result, reaction efficiency can be improved.

Moreover, since the temperature difference in the flow-passage direction of the reaction-side flow passage 210 can be reduced, the heat stress acting on the heat-transfer partition 110 can be reduced, and distortion of the heat-transfer partition 110 can be suppressed.

In this embodiment, an active metal carried by a metal plate having a corrugated shape is used as the catalyst 140, but by forming the catalyst 140 in the corrugated shape, the number of folding-backs can be easily changed, and various contact areas with the reaction fluid can be realized.

Moreover, if the catalyst 140*a* and the catalyst 140*b* are arranged on the reaction-side flow passage 210, the catalyst 140*a* and the catalyst 140*b* are desirably arranged away from each other. As a result, such a state that the flow of the reaction fluid stagnates between the catalyst 140*a* and the catalyst 140*b* can be avoided.

The preferred embodiment of the present disclosure has been described by referring to the attached drawings, but it is needless to say that the present disclosure is not limited to such embodiment. It is obvious that those skilled in the art would conceive of various variations or modifications within a range described in the claims, and it should be understood that those also belong naturally to the technical range of the present disclosure.

For example, in the above-described embodiment, the active metal carried by the metal plate having a corrugated shape is described as an example of the catalyst 140, but the shape of the catalyst 140 is not limited as long as the catalyst 140 can be provided in the reaction-side flow passage 210 so that the contact area with the reaction fluid is larger on the downstream side than on the upstream side in the reaction-side flow passage 210. For example, it may be the active metal carried by a metal plate having a flat plate shape, and in this case, it is only necessary that a surface area of the metal plate is made different between the upstream side and the downstream side. Moreover, the contact area with the reaction fluid can be made larger on the downstream side than on the upstream side in the reaction-side flow passage 210 by changing an amount of the active metal to be applied on the plate.

Moreover, in the above-described embodiment, the case in which the catalyst 140 is divided into two parts and arranged in the flowing direction of the reaction fluid in the reaction-side flow passage 210 is explained as an example, but the number of parts is not limited to two but the catalyst 140 may be divided into three parts or more and arranged or the catalysts 140*a* and 140*b* may be integrally constituted, for example.

Moreover, in the above-described embodiment, the heat-medium side flow passage 220 is explained as an example of the temperature controller. However, the temperature controller may be a heater or a cooler as long as the reaction fluid can be heated or cooled from outside the reaction-side flow passage 210.

What is claimed is:

1. A reactor comprising: a reaction-side flow passage through which a reaction fluid as a reaction object flows, the reaction-side flow passage being provided with a hollow space having a constant width; a heat-medium side flow passage provided in parallel with the reaction-side flow passage through a heat-transfer partition, provided with a hollow space formed therein through which a heat medium flows, the space of the heat-medium side flow passage having a constant width and extending in a direction parallel to a flow direction of the reaction fluid in the reaction-side flow passage; and a catalyst configured to promote a reaction of the reaction fluid, the catalyst separately formed from the reaction-side flow passage and provided in the reaction-side flow passage so that a cross section of the reaction-side flow passage defined by the catalyst is smaller on a downstream side than on an upstream side in the reaction-side flow passage; wherein the catalyst has a plate shape, the catalyst is divided into a plurality of parts that are arranged away from each other in a flowing direction of the reaction fluid in the reaction-side flow passage, and wherein the catalyst is corrugated.

2. The reactor according to claim 1, wherein
a gas flows as the heat medium in the heat-medium side flow passage.

3. The reactor according to claim 1, wherein the reaction-side flow passage and the heat-medium side flow passage are alternately stacked.

4. The reactor according to claim 2, wherein the reaction-side flow passage and the heat-medium side flow passage are alternately stacked.

\* \* \* \* \*